Patented Apr. 20, 1926.

1,581,441

UNITED STATES PATENT OFFICE.

JOHN HARRIS, OF CLEVELAND, OHIO, ASSIGNOR OF ONE-HALF TO JAMES R. ROSE, OF EDGEWORTH, PENNSYLVANIA.

GASEOUS FUEL.

No Drawing. Application filed June 2, 1923. Serial No. 642,908.

*To all whom it may concern:*

Be it known that I, JOHN HARRIS, a citizen of the United States, residing at Cleveland, in the county of Cuyahoga and State of Ohio, have invented a certain new and useful Improvement in Gaseous Fuel, of which the following is a full, clear, and exact description.

This invention relates to gaseous fuel, and more particularly to a gaseous fuel which, when used in combination with oxygen, is especially adapted for the purpose of cutting and welding metals.

It is the general object of the invention to provide a gaseous fuel which is relatively inexpensive; which will enable the cutting and welding to be performed in a most efficient manner; and which will enable the welding operation, in particular to be conducted with a minimum danger of carbonizing the weld.

As is well known, acetylene has long been employed for welding and cutting purposes. Its use, however, is attended with the disadvantages that it cannot be shipped in tanks, owing to its liability to dissociation under the pressures which obtain in such tanks; and it is relatively expensive, not only on account of the initial cost of the gas, but because of the relatively large amount of oxygen required for its complete combustion. Furthermore when used for welding purposes, it is liable to carbonize the weld, thus lessening the strength and efficiency of such weld.

I effect a material reduction in the cost of gaseous fuel over that of acetylene and obtain an efficient welding and cutting of metals by my gaseous fuel, which is formed by mixing acetylene and ordinary artificial illuminating gas in the proportions not materially less than 10 and not materially more than 50 parts by volume of acetylene to not materially more than 90 and not materially less than 50 parts by volume of such artificial gas. The ordinary artificial illuminating gas referred to is ordinary coal gas, the analysis of which is given specifically hereinafter.

A mixture of these gases possesses the advantage that the fuel thus formed may be compressed into tanks without the dissociation of the acetylene, as the latter will be diffused throughout the illuminating gas; the greater the proportion of illuminating gas to acetylene, the higher may be the compression to which the mixture is subjected without dissociation of the acetylene.

The gaseous fuel produced by the mixture herein set forth will give a visible reducing cone which is longer than that produced by the combustion of acetylene alone with oxygen; it reduces to a minimum the danger of the flame flashing back into the tanks, since the igniting point of the fuel mixture is higher than that of acetylene alone. Because of the presence of the illuminating gas, the danger of carbonizing the weld (and hence weakening the latter) is reduced to a minimum. Finally, the fuel mixture is considerably more economical of production and combustion than is acetylene alone, due to the materially lower cost of the illuminating gas.

While the gaseous fuel described herein can be used advantageously for welding purposes and for heating large masses of metal, it is especially useful when used for the cutting of metals, the illuminating gas constituent serving to raise the igniting point of the acetylene and to enable this result to be accomplished by the use of the cheaper illuminating gas, in large proportion.

The artificial illuminating gas referred to herein is a coal gas of approximately the following composition:

*Percentage by volume.*

| | Per cent. |
|---|---|
| $CO_2$ | 2.0 |
| Illuminants | 4.0 |
| $O_2$ | .5 |
| $CO$ | 8.0 |
| $H_2$ | 47.0 |
| $CH_4$ | 32.0 |
| $N_2$ | 6.5 |

Having thus described my invention, what I claim is:

A gas especially useful for welding and cutting purposes consisting of a mixture of acetylene and ordinary coal gas in proportions of from not materially less than 10 parts to not materially more than 50 parts by volume of acetylene, to from not materially greater than 90 parts to not materially less than 50 parts by volume of such coal gas.

In testimony whereof, I hereunto affix my signature.

JOHN HARRIS.